3,329,514
REFRACTORY BODY AND METHOD OF
MAKING SAME
Alfred C. Saunders, Hamburg, and John F. Grant, Orchard Park, N.Y., assignors, by mesne assignments, to Ferro Corporation, Cleveland, Ohio, a corporation of Ohio
No Drawing. Filed Apr. 29, 1965, Ser. No. 452,024
5 Claims. (Cl. 106—56)

This application is a continuation-in-part of our application Ser. No. 191,278 filed Apr. 30, 1962, now abandoned.

Our invention relates to a series of improved refractory bodies consisting of various granular refractory materials admixed with graphite together with a bond of silicon nitride plus carbon. These refractories are substantially completely infusible, are extremely hard and strong and resist wetting by molten metals to a marked degree. They are moreover resistant to reaction with combustion gases even at very high temperatures and certain of them are of such low density as to be particularly indicated for such air borne uses as rocket liners and combustion chambers.

In the manufacture of these refractories as covered in this application, we admix the primary refractory materials such as silicon carbide, fused alumina, zircon, mullite, periclase, etc., in granular form with a certain amount of graphite and with finely powdered silicon metal or a high silicon alloy and carbon-forming binder such as tar or pitch in such form and percentage as to hold the mass together when compacted into desired shapes as will be illustrated in examples below. Synthetic resins which carbonize on heating may also be used in whole or in part as the original binder.

A companion application, Ser. No. 451,936 filed Apr. 29, 1965, now Patent No. 3,291,623, relates to a similar subject matter except that no graphite is included in the bodies therein. The bodies of the two applications require somewhat different handling and are used for different purposes. Those of the present application, incorporating graphite, are particularly suitable for applications in which only moderate strength is required but in which resistance to heat shock and ability to resist molten metals is paramount.

Admixtures of silicon carbide granules and flake graphite are particularly advantageous for air borne applications as the densities of both these materials are relatively low and the silicon carbide imparts strength and abrasion resistance while the graphite gives a degree of flexibility (low modulus of elasticity) which gives superior resistance to heat shock.

The formed pieces after compacting the mix in suitable molds are completely supported for firing by burying them in crushed carbon, flake graphite or even in sand. In any event they are held rigidly in place, shape and size while the volatiles in the tar or pitch are driven off as the furnace temperature rises. This leaves the refractory granules and the silicon powder held in a rigid but porous carbon mass where in the next step of the process the silicon is converted to $Si_3N_4$ by contact with hot nitrogen from the surrounding furnace gases.

In order to accomplish this we interpose between the buried pieces and the surrounding furnace atmosphere a layer of permeable carbon or graphite granules held in a suitable refractory container such as a loosely covered box or sagger into which the furnace gases can readily permeate as the furnace is heated to 2100° F. or higher. In this way any oxygen or $CO_2$ in the furnace gases is converted to CO on its way through the permeable carbon layer leaving the nitrogenous portion of the gases unchanged at that stage. The silicon powder however has a strong affinity for nitrogen at temperatures such as 2200° F. to 2400° F. reacting with it to form $Si_3N_4$ which is a solid. The gaseous nitrogen is thus continuously used up and still more is drawn in through the carbon until the Si has all been converted to nitride (or under certain conditions to beta SiC). The pores adjacent the Si are partially filled with the newly formed nitride so that the body becomes hard, strong, considerably denser and relatively impermeable when the attractive power of the Si for $N_2$ has been used up.

The silicon nitride so formed reinforces the previously relatively weak carbon bond, each portion appearing to protect the other from attack by ambient gases and making the body as a whole infusible at temperatures over 3000° F.

In firing our bodies, we raise the temperature of the furnace to around 2100° F. in perhaps 15 hours and thereafter hold it at 2100–2400° F. for a minimum of 12 hours during which most of the silicon converts to nitride. We then raise the temperature to 2750–2900° F. in a matter of 5 hours, which seems to increase the bonding action and materially increases the strength of the fired bodies. It further assures the elimination of any residual free silicon in the bodies.

After the body has been thus fired, it is unburied and can be thereafter reheated without further change save that when the heating is in a strongly oxidizing atmosphere, the silicon containing ingredients (nitride, carbide or oxide if present) form thin protective films of silica within the very fine pores of the body and plug them so tightly that oxidation of the body proceeds very slowly.

While the composition of bodies within the scope of our invention can be varied over a considerable range, the important factors in the present invention are (1) that there should always be a small but positive amount of graphite present (from about 5 to about 15% of flake graphite preferred), and (2) that there should always be a bond of porous carbon tightly adhering to the graphite and other refractory granules with silicon nitride formed in the pores thereof with a minimum of either uncombined silicon or freshly formed beta silicon carbide in the body. To attain this desired state both the amount of pore forming bond and the amount of silicon initially present must be carefully controlled both in absolute amount and in proportion to one another.

We attempt at the outset, during the mixing and forming of our bodies, to thoroughly coat and wet the surfaces of our main granules with a carbonaceous material which will adhere tightly to them even after carbonization and which upon heating will carbonize with evolution of gas, leaving the adhering carbon in a highly porous state. Unless the silicon is first taken up by reaction with the nitrogen, it is quite reactive with the porous carbon at temperatures above about 2400° F., forming beta silicon carbide with an increase in volume which is usually undesirable.

In the bodies of the present invention we find that the inclusion of from about 4 to about 18% of graphite is beneficial in increasing the resistance of the body to damage by heat shock. The graphite also lowers the density of the product and so makes it more desirable for air borne and rocket applications. The presence of the graphite however weakens and softens the body so that graphite above about 18% in this type body is not desirable as it produces a body which is too subject to damage by abrasive forces. Our preferred bodies contain from 5 to 15% of graphite. While we may use graphite of other types, we prefer the use of natural flake graphite which seems to impart an improved tenacity to the body and make it more thermally flexible.

Compared to our other refractory granules, graphite is however a material of relatively low specific gravity and particularly when in flaky shape has a much larger surface area per unit weight than do heavier materials in the form of chunky or rounded granules. We find that to coat the surfaces of these lighter pieces with an adherent coating of porous carbon requires a higher percentage of the carbon than with chunkier granules such as silicon carbide or fused alumina, etc. While as little as 2% of porous carbon gives a body which holds together, the optimum amount of such porous carbon in our type bodies incorporating graphite runs from 4 to 7 of the weight of the body depending upon the amount of graphite and the nature of body desired. This means that in our initial mix we incorporate from about 7 to 18% of tar, pitch, resin, etc.—prior to carbonization. Tars and pitches yielding from 30 to 50% of their weight as carbon after carbonization are well adapted for our purposes or we may use resins such as Durez Plastics Co's. Durez No. 14383 furfuryl alcohol resin. Phenolic or urea resins may be similarly used. In any case the carbonizable binder should be used in such proportion as to yield from 4 to 7% of a porous carbon binder after calcination at 2000° F. or higher.

In our raw mix we mix the graphite with from 5 to 15 times its weight of other refractory granules such as those listed above, bringing the total proportion of combined graphite and refractory granules to from approximately 75 to 90% of the total weight of the raw mix.

Along with this material we mix finely divided silicon metal or high silicon alloy, such as 100 mesh and finer 90% Si together with a carbonaceous binder as above. We find that in general the percent of Si should not greatly exceed that of the carbon bond to be produced in the final body and that it should in all cases fall between about 2 and about 14% of the weight of the raw mix. This gives adequate strength without introducing excessive silicon which does not react to form nitride during firing. From about 3 to about 20% $Si_3N_4$ in the final body gives moduli of rupture between 80 and 3000 p.s.i. in the final body along with excellent resistance to heat shock. The oxidation resistance of our bodies is fair at temperatures below about 2000° F. and good at temperatures above that range.

Conversion of the silicon to nitride increases its weight by over 50% and the weight of the carbonaceous binder decreases so that our preferred final bodies contain from 5 to 20% by weight of $Si_3N_4$.

When the amount of silicon is increased past about 14% of the raw mix (depending to some extent on the other ingredients) we find two objectionable factors enter. (a) The development of $Si_3N_4$ in the outer layers of the body tends to prevent penetration of the nitrogen gas to the interior of the piece resulting in a cored body of non-homogeneous structure with serious tendency to rupture on repeated heating and cooling in use; and (b) due to the presence of uncombined silicon in the inside of the body the resistance of the finished body to reaction and attack by molten metals such as aluminum is diminished because the uncombined silicon on the interior tends to permeate to the surface where it attracts wetting and reaction with the metal.

When the accessibility of the Si within the body to react with nitrogen is thus interfered with, a second difficulty also arises in that at temperatures above about 2400° F. the free Si tends to react with the free porous carbon in the body destroying the desired porous carbon bond and forming beta SiC with disruption of the body. When the free carbon content lies between 4 and 7% we find that these difficulties are at a minimum and optimum results are achieved when the initial silicon content of the mix is between about 2 and 14% resulting in the formation in the fired body of from 3 to about 20% of $Si_3N_4$.

It should also be pointed out that firing temperatures are somewhat critical. Below about 2000° F., there appears to be little or no formation of silicon nitride while at temperatures of 2400° F. or more and particularly above 2600° F. the free silicon combines with carbon forming beta SiC with a tendency to disrupt the body so that it is important to hold the temperature below that value for several hours as indicated above to convert the silicon to nitride before raising it higher.

The following examples of bodies made in accord with our invention are cited by way of illustration and not for limitation. The ingredients could be varied over a considerable range as explained, both in absolute amounts and in relative proportions.

*Example 1*

A mix was made of the following ingredients:

|  | Percent |
|---|---|
| 100 mesh and fine flake graphite (85% C) | 18 |
| 100 mesh and finer SiC | 54 |
| Tar (or 17.6% tar and 2% pitch) yielding 7% C | 18 |
| 100 mesh and finer Si | 10 |

These ingredients were mixed to form a semi-plastic mass which was then rammed in a steel mold to form cylinders 4″ long x 2″ O.D. x 1½″ I.D. These were carefully removed from the mold and kept chilled to prevent slumping until they were set on end in a silicon carbide sagger where they were buried in 8 mesh and finer graphite flakes which covered them two inches deep and completely surrounded them. This graphite was compacted as much as possible by pressing it down and gently jolting the sagger which was then loosely covered with a silicon carbide slab.

The covered sagger was then placed in a furnace and fired by a gas flame to 2200° F. for twelve hours after which it was raised to 2750° F. and then allowed to cool in the furnace till the cylinders could be handled comfortably to remove them. They were found to have approximately the following composition:

|  | Percent |
|---|---|
| SiC | 68 |
| Free C | 21 |
| $Si_3N_4$ | 7 |

Test bars of this mix similarly made and fired showed a density of 2.00 and a cold transverse modulus of rupture of 2000 to 2500 p.s.i.

It will be noted that in Example 1 the final percentage of free carbon is 21%. This 21% includes both flake graphite and the carbon from the tar. The proportion of porous carbon bond appears to be approximately 5% which is in the range which we claim.

*Example 2*

A mix was made of the following ingredients:

|  | Percent |
|---|---|
| Fine flake graphite (85° C) | 10 |
| 8 mesh and finer SiC | 67 |
| Tar | 13 |
| 100 mesh and finer Si | 10 |

These ingredients were mixed and formed into bars which were buried as in Example 1 and fired as above described. The fired bars had a density of 2.36 and a modulus of rupture of 3240 p.s.i. They analyzed approximately 67% SiC, 11% graphite, 5.6% bond carbon and 14% $Si_3N_4$. The modulus of elasticity was $6.8 \times 10^{-6}$ which with the high modulus of rupture would denote unusually high resistance to heat stock.

*Example 3*

Another mix was made with the following composition:

|  | Percent |
|---|---|
| Fine flake graphite | 6 |
| 8 mesh and finer SiC | 72 |
| Tar | 12 |
| 100 mesh and finer Si | 10 |

These ingredients were mixed, formed into bars which were buried as above described and fired to 2200–2400° F. for 12 hours, then raised to 2750° F. and allowed to cool to room temperature in the furnace. The fired bars had a density of 2.42, a modulus of rupture of 3610 p.s.i. and a modulus of elasticity of $8.3 \times 10^{-6}$. They analyzed 5.3 bond carbon and 6% graphite. $Si_3N_4$ was 15% and SiC 74%.

While in these examples, we have recited only mixtures of silicon carbide and graphite, the other refractory granules recited in the third paragraph of this specification may be substituted for the silicon carbide and pieces formed therefrom processed as here described when special chemical properties desired are best obtained with such other materials, e.g. resistance to alkaline fluxes.

As indicated above, the resistance to oxidation of our bodies is only fair at temperatures below about 2000° F. In order to improve their performance in this range we sometimes coat them with a glaze to keep oxidizing gases out. Such a glaze and its method of application is described in U. S. Patent 1,828,767. We find these glazes compatible with our bodies as herein described.

In most cases, we fire our bodies in a fuel fired furnace where the nitrogen to form nitride comes from the air used for combustion. It is obvious however that nitrogen gas from any source such as bottle gas or ammonia may also be used and the temperature raised to the desired values by any suitable method of heating compatible therewith.

Having thus described our invention and shown examples of its application, we claim:

1. A refractory body composed of granules of at least one refractory material selected from the group consisting of silicon carbide, mullite, aluminum oxide, zircon, and periclase admixed with from 4 to 18% of graphite and bonded with a mixture of 2 to 7% of porous carbon and 5 to 20% finely divided silicon nitride dispersed throughout said carbon.

2. A refractory body composed of refractory granules of a mixture of approximately one part graphite to from five to approximately fifteen times its weight of silicon carbide, bonded with a mixture of porous carbon and finely divided silicon nitride dispersed throughout said carbon in which the porous carbon constitutes 2 to 7% and the silicon nitride 5 to 20% of the weight of the body.

3. A refractory body in accord with claim 1 in which the percentage of graphite is from 5 to 15%.

4. A raw mix for forming a refractory body in which mix granules of graphite are admixed with from 5 to 15 times their weight of other granular refractory material selected from the group consisting of silicon carbide, fused alumina, zircon, mullite and periclase together with a carbonizable binder in such proportion as to yield from 2 to 7% of a porous carbon binder in the body after calcination above 2100° F. and powdered silicon in an amount not materially in excess of the porous carbon binder, the graphite and granular refractory composing from 75 to 90% of the mix.

5. A refractory body consisting of from approximately 75 to 90% of a mixture of granules of at least one refractory material selected from the group consisting of silicon carbide, fused alumina, zircon, mullite and periclase admixed with from 5 to 15% by weight of flake graphite, said mixture of granules being held together by a porous carbon binder comprising from 2 to 7% of the weight of the body and containing in the pores thereof silicon nitride in amount from 5 to 20% of the weight of the body.

References Cited
UNITED STATES PATENTS

| | | | |
|---|---|---|---|
| 1,483,507 | 2/1924 | Brockbank | 106—44 |
| 2,897,572 | 8/1959 | Hansen | 106—44 |

TOBIAS E. LEVOW, *Primary Examiner.*

J. E. POER, *Assistant Examiner.*